United States Patent
Alvarez et al.

(10) Patent No.: US 8,067,850 B2
(45) Date of Patent: Nov. 29, 2011

(54) METHOD FOR CREATING A LOW FLUID PRESSURE DIFFERENTIAL ELECTRICAL GENERATING SYSTEM

(75) Inventors: Raymond Alvarez, Goodyear, AZ (US); Daniel Dale Gilson, San Juan Capistrano, CA (US)

(73) Assignee: Techstream Control Systems Inc, Goodyear, AZ (US)

( * ) Notice: Subject to any disclaimer, the term of this patent is extended or adjusted under 35 U.S.C. 154(b) by 733 days.

(21) Appl. No.: 12/014,651

(22) Filed: Jan. 15, 2008

(65) Prior Publication Data
US 2009/0178462 A1 Jul. 16, 2009

(51) Int. Cl.
*F03B 13/00* (2006.01)
*H02P 9/04* (2006.01)

(52) U.S. Cl. .......................................................... 290/54

(58) Field of Classification Search .................. 290/54, 290/43, 55, 44, 1 R; 415/208.2, 3.1, 144; 60/398
See application file for complete search history.

(56) References Cited

U.S. PATENT DOCUMENTS

| | | | |
|---|---|---|---|
| 3,750,001 A * | 7/1973 | McCloskey | 322/35 |
| 4,838,310 A | 6/1989 | Scott et al. | |
| 5,333,785 A | 8/1994 | Dodds et al. | |
| 5,874,798 A | 2/1999 | Wiegele et al. | |
| 5,905,311 A | 5/1999 | Hess et al. | |
| 6,768,218 B2 | 7/2004 | Yumita | |
| 6,779,978 B2 * | 8/2004 | Camargo Do Amarante | 416/228 |
| 6,885,114 B2 | 4/2005 | Baarman et al. | |
| 7,026,723 B2 * | 4/2006 | Moreno | 290/55 |
| 7,042,113 B2 | 5/2006 | Aukon | |
| 7,074,008 B2 | 7/2006 | Motonaka et al. | |
| 7,084,521 B1 | 8/2006 | Martin | |
| 7,112,892 B2 * | 9/2006 | Mahowald | 290/54 |
| 7,190,088 B2 | 3/2007 | Heidel | |
| 2008/0231056 A1 * | 9/2008 | Wen | 290/54 |
| 2009/0179426 A1 * | 7/2009 | Alvarez et al. | 290/54 |
| 2009/0314353 A1 * | 12/2009 | Vasshus et al. | 137/14 |
| 2010/0109331 A1 * | 5/2010 | Hedtke et al. | 290/54 |

* cited by examiner

*Primary Examiner* — Julio Gonzalez
(74) *Attorney, Agent, or Firm* — Ken Dallara; Law Office of Ken Dallara

(57) ABSTRACT

This invention involves a method of creating a hydroelectric turbine system that is capable of producing electricity while sustaining a majority of the fluid flow or hydraulic pressure within the pipe line or pipe network driving the system. The system's objective is to shave as little pressure as possible from an enclosed pipe system that requires pressure to operate and function properly. More particularly, this invention relates to a hydroelectric turbine generator system wherein the system is specially designed and configured with an unique impeller and fluted turbine housing that enable a generator device to produce a particular amount of electric current and voltage, while yet minimizing flow restriction and pressure loss to the fluid pressure driving the system.

23 Claims, 4 Drawing Sheets

FRONT CROSS SECTION

SIDE CROSS SECTION

METHOD FOR CREATING A LOW FLUID PRESSURE DIFFERENTIAL ELECTRICAL GENERATING SYSTEM

FIELD OF THE INVENTION

This invention relates to a hybrid hydroelectric turbine system for producing electric power. More particularly, this invention relates to a method of generating power using a hybrid hydroelectric turbine generator device for producing electric power; wherein, the turbine's impeller and flute housing are specifically designed, for maximum efficiency, so as to produce an electric current and voltage, while yet minimizing fluid flow restriction and pressure loss to the hydraulic delivery system and/or the fluid flow pipe line supply source. The design objective of this method is characterized as minimizing the pressure differential between the system's inlet and wherein outlet sections or sustaining downstream hydraulic pressure is as critical and equally important to producing electric energy.

BACKGROUND OF THE INVENTION

Various turbine-generator designs have been utilized to produce electric power for many years and are well documented. A typical turbine generator system is an electrical generator device that converts kinetic energy derived from a fluid flowing under pressure to electrical energy usually using electromagnetic induction. Though there are a multitude of different designs that describe various types of hydroelectric turbine systems that serve different applications, they all share a single objective. That is, they seek to produce as much electric energy as possible utilizing as much available hydraulic flow and pressure as possible. Maximum efficiency is characterized, in these designs, by achieving high levels of electrical production using all available fluid flow and particularly pressure from a supply source. None, if any, considers the condition of the fluid material once it has left the surface of the final blade or impeller vane that serves to drive a generator shaft.

A traditional turbine-generator system consists of a turbine impeller, impeller housing, and a generator or alternator device which are coupled via a shaft. The turbine is used to convert momentum from a fluid stream into rotary motion. The shaft transmits the motion to the generator rotor, which typically contains permanent magnets or coil windings around each of its poles. Power is generated by flow under pressure that comes into contact with an impeller or a multiple blade type device that turns a common shaft.

There are different types of impeller designs and are generally considered reaction, cross flow or impulse types. They develop kinetic energy by the drive force supplied by a concentrated stream or jet of fluid which is deflected off cups or paddles tangentially or axially across an impeller such as in a Pelton, Turgo, Banki, Kaplan or Francis turbine designs. The water's potential energy is converted to kinetic energy with a nozzle or restrictive orifice in some cases. The high speed water jet is then directed onto the turbine blades which deflect or reverse the flow such as is characteristic of the popular Turgo turbine design. The Francis turbine is also a common design used in many large applications such as dams and flowing rivers where piping is used to convey water down flumes to develop head pressure that drives this reaction type turbine, which means that the working fluid changes pressure as it moves through the turbine, surrendering its energy. A casement or housing is needed to contain the water source or intake flow and is called an inlet scroll. The impeller is located between the high pressure fluid supply source and the low pressure water exit located just after the impeller.

The Francis turbine's volute or inlet scroll is spiral shaped. Guide vanes direct the water tangentially to the runner. This radial flow acts on the runner vanes, causing the runner to spin. The guide vanes or wicket gate may be adjustable to allow efficient turbine operation for a range of water flow conditions. The impeller is an inward flow design and moves the fluid through the runner as its spinning radius decreases, further acting on the secondary runner blades or vanes.

Virtually, all hydroelectric turbine generator designs share a common objective of producing as much electric energy as possible and prefer maximum flow under high pressure to achieve that goal. Efficient designs are built upon the premise of extracting as much energy as possible from the fluid flow under pressure driving the system and are not, typically, concerned with the state of the flow once it has been discharged from the impeller. That is, the primary objective is energy production and not sustained downstream pressure. Such designs achieve higher flow velocity by increasing head pressure using several means and equate efficiency to the design if it uses all available pressure to produce electricity. A common turbine design modifies inlet flow by attempting to concentrate it prior to its contact with the impeller. This is accomplished by the use of nozzles or channeling flow down into a smaller orifice, chamber or pipe size diameter like a flute type structure to increase the flows pressure right before it contacts the turbine. Such restriction increases flow velocity or speed across the impeller's veins or blades and turns the generator faster to produce more power, but subsequently sacrifices downstream pressure in the process.

However, there are numerous other uses or applications that would benefit substantially from hydroelectric turbine power if it could be utilized, but can not at this time because of the restrictive nature or pressure differential characteristics. A product has not been developed, to this point that specifically addresses the needs of such applications or markets where electricity is use to power various electronic devices.

Fluid flow conveyance systems like piped irrigation or large volume water, oil or gas transfer and especially ones that are remotely located or difficult to access with conventional power are best managed using processor driven control systems that incorporate sensor input and communication capability. Applicable electronic control technologies that enable various levels of monitoring and management control of remotely located pipe lines require electricity. Such systems are usually supplied by metered utility power, wind or solar power which can be difficult to impossible or impractical to implement. Therefore, furnishing power to electronic control and/or communication systems, lighting etc. using energy derived from the same pipe lines the system is managing, or in close proximity to, would provide an ideal power alternative.

Solar and wind electrical generation are good renewable energy alternative sources but have several disadvantages. From an aesthetic stand point they are not attractive for urban and suburban use and can be susceptible to vandalism because of the high profile installation requirements of both systems. Both require that they be placed sufficiently high above grade level in order to effectively capture and produce energy, which make them a good target for vandals. Furthermore, in remote locations like rural environments, they are even more susceptible to theft and vandalism, again because of their high profile nature necessary to produce power. Solar and wind generating systems can be very expensive to purchase and do not guaranty a regular supply of energy. They are dependant upon favorable weather conditions, which can present enormous problems to mission critical systems that might depend on them for power.

What is needed then is a hydroelectric turbine generator system that is designed to extract a particular amount of energy from a fluid flowing under pressure yet is able to sustain most of or a majority of the inlet pressure downstream of the turbine device. Such a system would allow the production of electric power to implement important electronic components or other electrical equipment and still permit the continued operation of the fluid transfer system by sustaining its required operating pressure.

It is therefore, the purpose of this invention to provide a method that addresses the need for generating electric power using an inline turbine-generator system, which generally consists of a reaction type axial impeller, turbine housing and an electric generator device. This invention's method provides a hydroelectric turbine system that is able to generate a particular amount of electric power by converting energy from fluid flowing under pressure through a pipe, that subsequently drives the impeller connected to a shaft that turns a generator device that produces electricity, and systematically sustains a majority of the upstream inlet pressure downstream of the turbine housing's discharge end. Furthermore, and critical to this invention's method, is the expeditious manner in which fluid is conveyed through the system by maintaining as much flow velocity as possible.

Since the design objective of this invention is to produce enough energy to power, for example a control system, solenoid valves and/or an electrical storage means like batteries or capacitors that supply the system when generated power is not available. However, when supplying a charge to batteries, more is always better to assure the maximum amount is saved and stored. Creating a sufficient amount of voltage and current, or even more, does not require significant pressure or pressure loss to the hydraulic system due to the efficiency of the inventions turbine design. This turbine design can produce over ten amperes of power depending upon the generator or alternator device used in conjunction with the system and the impeller vane height and length, and is enough to supply a charge to a battery and an electronic system's requirement. Surplus hydraulic pressure is subsequently used so that very little, if any, is wasted.

DESCRIPTION OF THE INVENTION

The hydroelectric turbine generator system of this invention is called a small, mini, micro or pico type reaction turbine design and is capable of maintaining an amount equal to or less than fifty 50 percent of the dynamic pressure differential between said inlet and outlet sections.

Most small and large scale water or fluid flow delivery or transfer systems require certain amounts of hydraulic pressure to drive them or to push fluid from one location to another through a pipe system or pipe line network. Utilizing the kinetic energy from fluid flow under hydraulic pressure to power electronic systems or other electrical devices in remote areas is a logical way to promote the use of such important electronic monitoring, management and control systems. Remote facilities like fixed cellular sites, wireless repeater stations, weather or atmospheric sensors or even homes and commercial or industrial facilities could be powered if a pipe line that contains a fluid flowing under pressure were in near proximately and retrofitted with a small sized turbine as explained in this method. Only a portion of the kinetic energy from fluid flowing under pressure would be utilized, by this invention, to power such devices, systems or facilities while still permitting a substantial amount of that energy to continue its mission of moving the same fluid from one place to another. The method explained could also serve as a control means to slow the flow down to prevent damage from out of control pressures or hydraulic hammering and of course to produce electric energy.

Since the system produces low voltage and powers devices that are already designed to operate with low voltage, expensive electricians are not required for installation or maintenance. Additionally, there will be less liability exposure to landowners and contractors working with or maintaining the system since low voltage supply and equipment are generally viewed as being extremely safe.

U.S. Pat. No. 7,190,088 issued to Heidel, claims a hydroelectric turbine generating system design that can be utilized in pressurized main pipe lines, water tower pipe lines, sewage lines canals and aqueducts. The turbine design explained teaches a Pelton style impeller that is driven tangentially with the blade ends or cups on one side of the turbine being in contact with water flowing through a pipe; wherein, said flow drives the shaft that turns the generator. The design appears to make only limited contact by blade ends in water flow and does not appear capable of taking advantage of the full flow volume that would be contained in a typical system the patent describes. This design characteristic is very different to, and contrasts this invention's design. The turbine is as taught by this invention, incorporates a vaned impeller and not blades as explained in Heidel, and makes full contact with all fluid flowing through the pipe it is connected to. This constracts, the invention turbine, which is capable of efficiently producing more energy by utilizing all flow volume, and yet without robbing the hydraulic pipe line system or network of needed pressure to continue the movement of fluid to fulfill downstream pressure requirements.

The invention's turbine as explained herein could be implemented to power specific field devices such as a FX module found in the Techstream Control System's, Inc. XLinc wireless valve and sensor transceiver system U.S. Pat. No. 7,050,887. The FX or field transceiver module is hardwired to valves and sensors and wirelessly receives command signals from a CX module. As the FX module receives command signals from the controller and CX module to open or close valves. The XLinc's FX module is typically installed in a remote location and requires electric power to operate. Thus, the invention's turbine could be utilized to charge a battery that powers the FX module, or other devices like it, and its valves or sensors. Similarly, other electronic devices could be powered such as relays, switches or any other devices that require VAC or VDC electric power to operate. The invention's turbine system would be used to charge a battery or capacitor that provides power to those systems or can power an electronic device directly.

A Wireless Irrigation Control System is described in Dodds U.S. Pat. No. 5,333,785, and explains a system wherein the irrigation valves and associated decoder devices receive electric power from a plurality of power generating devices that are in connection with and adjacent to each valve. Dodds explains that the generating means are specifically located to power field valves and not the entire system as is claimed here by this invention's turbine system. In fact, the inventions turbine does not claim a particular system size or capacity relative to pipe attachment sizing, power output or application, but rather a system design that can be applied to any size system and placed at any location within that system. Therefore, the invention's turbine can be applied to an entire electronic system or more, and is not limited to powering its valves, radio receiver and decoder only as explained in Dodds. Furthermore, by way of comparison, Dodds claims "a plurality of power generating means corresponding to each of said control valves and being located adjacent thereto", as explained in Dodd's claim 1, but does not claim the ability to power an entire electronic control system or recharge batteries that would be required to power an entire system. The Dodds power generating means is far more limited in its electrical output capacity; whereas, the TCS turbine is not so limited.

Motorola U.S. Pat. No. 4,838,310 explains a system, similar to Dodds that is limited to powering field valves and radio receiver devices and switch type mechanisms only and not an entire electronic control system wireless, wired or otherwise. The patent explains an irrigation system specifically and involves transmitting radio signals that actuate irrigation valves and a turbine power generating source that provides electricity to a battery that supply those valves and receiver module. Again, like Dodds, a specific control system is explained and even though reference is made to a turbine impeller generator means, it appears that it is only directed to function with the irrigation control system the patent claims. The "preferred battery" storage specification explained in Motorola calls for a NI-CAD battery and implies a smaller electronic system that targets a smaller power consuming device and not a complete electronic control system that incorporates multiple sensor inputs and communication equipment necessary to monitor and manage centrally from a remote office location, which the TCS turbine is designed to do. One versed in the art will recognize that a NI-CAD battery is typically used in smaller electronic devices and are not efficient or practical for use as a major large scale electrical storage alternative such as high amperes lead-acid batteries.

The physical appearance of the Francis turbine might appear closest of all existing hydro turbine designs to this invention because of its distinctive volute or scrolled shaped housing. However, the similarity is purely aesthetic as both operate in literally different directions. Though both require sealed impeller chamber housings so as to achieve maximum performance, every other aspect is entirely different and serve to function contrasting purposes.

There are at least three significant points that differentiate the Francis from this invention's design concept. First, the designs operate in opposite flow directions relative to their volute housings. Two, the inlet and discharge size dimensions are opposite. That is, the inlet is typically larger than the outlet on the Francis, contrasting the smaller inlet than the outlet that is characteristic of this invention. And finally, and most significant, the impeller designs are very different and neither would work in the other's turbine housing to achieve the same results. The Francis is in an inward flow design; whereas, this invention teaches an axi-radial flow type disk design that directs flow outwardly from the center rather than tangentially and then in on its self like the Francis.

This invention's turbine incorporates a scrolled discharge section to efficiently manage and release flow as it exits the impeller to sustain velocity; whereas, the Francis uses the scroll to manage inlet flow and directs it around the first runner vanes on its impeller. The two designs operate in opposite directions. That is, fluid flow enters the Francis turbine's inlet scroll portion of the housing first, and then second, contacts the impeller tangentially within the impeller chamber, and then third, immediately exits the system from the impeller's second vane runner. The invention's design, by contrast, takes flow straight into the impeller first, in an axial radial direction, and then releases it into the discharge scroll, and second, then out the outlet end where it is directed back into the fluid flow pipe line. The Francis simply drops the fluid flow out of the impeller's second vane runner and is typically unconcerned with it after that point; whereas, this invention's turbine organizes the flow after it leaves the impeller and seeks to preserve its momentum thereby sustaining it's kinetic energy.

Bringing the flow back to the center and on itself, as the Francis does, reduces flow velocity and contributes to restriction and would be inefficient relative to the invention's stated design objective.

The Francis design seeks to modify incoming flow by increasing head pressure head before hitting the first runner of vanes at maximum velocity. This inventions impeller, on the other hand, is of an outward flow design and seeks to sustain flow velocity by first contacting the face's spinner as hydrodynamically as possible in an axial direction to the center, and then directing it out radially over the curved face from the center. The inventions turbine utilizes the volute shaped scroll to convey fluid away from the impeller, where as, the Francis uses the scroll to direct it into the impeller.

DESCRIPTION OF THE PREFERRED EMBODIMENT

The turbine design requires that fluid flowing through the system, as herein described, encounters few, if any, hard or flat angle surfaces, straight or flat angle positive or negative corners or edges once it has entered the system. The hydrodynamic design requires that fluid flowing through the system encounter only sloping curved and rounded or radiused surfaces, rounded or radiused corners and edges and round bulbous ends or points, with the only exceptions being knifed straight edges where fluid flow makes first and last contact with a surface. This hydrodynamic design theme applies to all internal components that come into direct contact with fluid flow.

Turns in pipe direction leading into and out of the inlet and outlet sections of the inventions turbine ideally follow the same or similar sweeping curved designs contained within the turbine for the purpose of minimizing hydraulic restriction and pressure loss. Swept pipe sections or flexible hose can be utilized and can be made of a variety of materials including rubbers, poly materials, plastic materials, composites, iron, steel, alloys or any other material.

A by-pass valve can be any type of manual or automatic valve that can be adjusted to open or close, or any position in between. A manual valve such as a gate or ball valve could be adjusted and set at a variety of positions to enable more or less performance by the turbine. An automatic valve such as a solenoid hydraulic valve is utilized to restrict pipe line flow by setting the opening height of its internal flow control mechanism or by completely closing the device when full turbine performance is needed. A by-pass control valve option can also include actuation type valves or valves that are incrementally adjusted by a servo motor or an actuator. Such valve systems can be used to more precisely control the amount of flow that alternatively passes through the by-pass or through the main pipe line. Multiple by-pass lines can be incorporated to further contribute to more precise flow and pressure regulation.

BRIEF DESCRIPTION OF THE DRAWINGS

FIG. 8 is a system schematic showing the invention integrated into a piping system. It should be noted that fluid flow is diverted using angles approximately 45 degrees or less to facilitate the least amount of turbulence and pressure loss.

DETAILED DESCRIPTION OF THE PREFERRED EMBODIMENT

Figure 1:
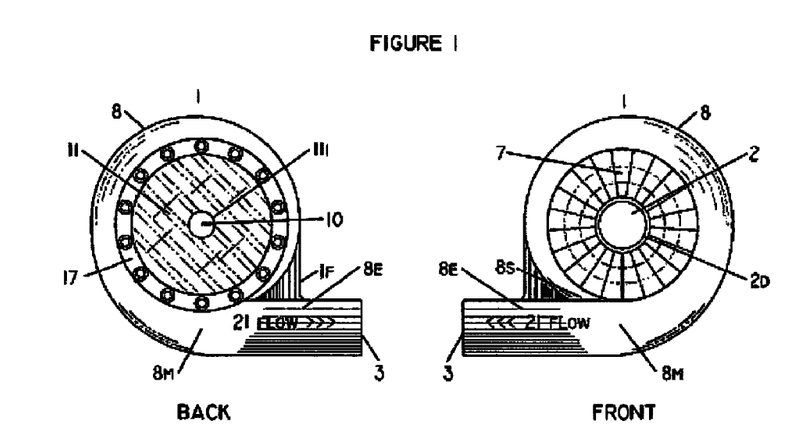
FIG. 1 details the front and back exterior projections of the housing.
Figure 4:
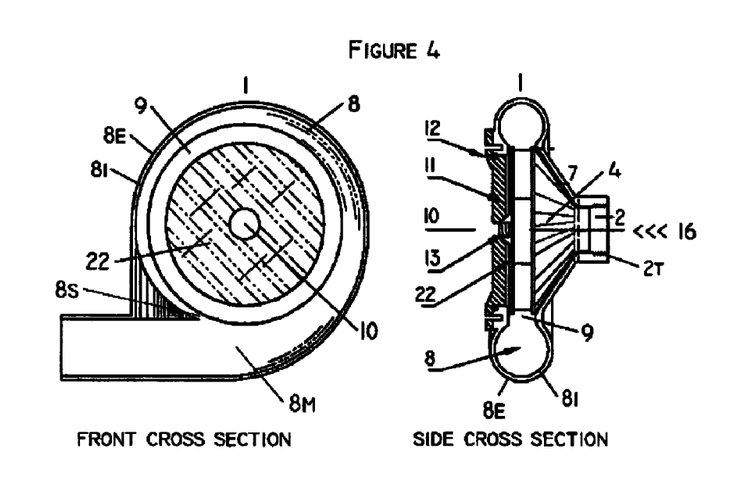
FIG. 4 shows the front and side cross-sectional views of the housing unit with impeller installed in the side view.
Figure 5:
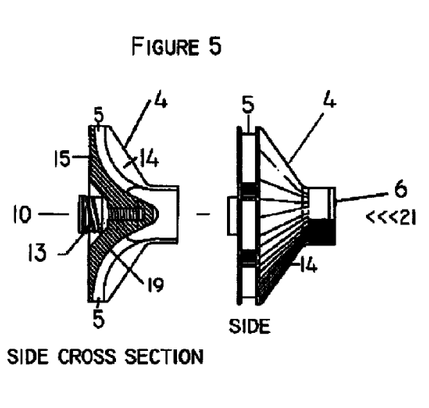
FIG. 5 is an exploded view of the impeller and the impeller shroud.
Figure 6:
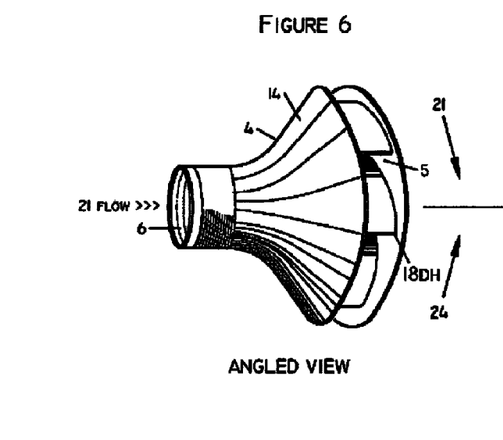
FIG. 6 is an oblique angular view detailing the roundness of the shroud and impeller.
Figure 7:
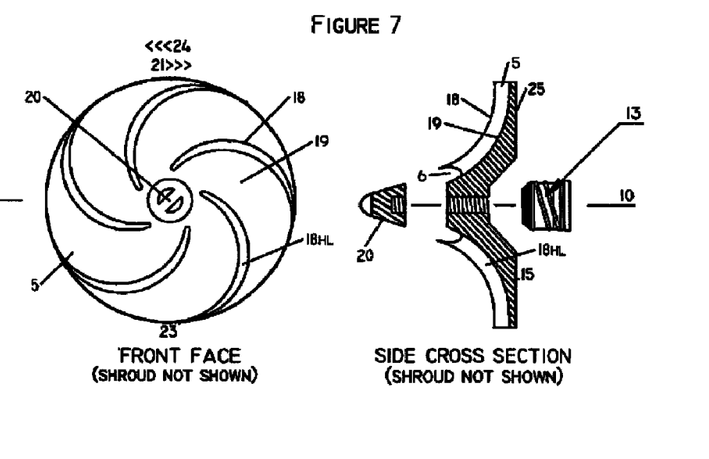
FIG. 7 is a front view of the impeller illustrating a potential vane layout and a cross-sectional assembly view.
Figure 8:
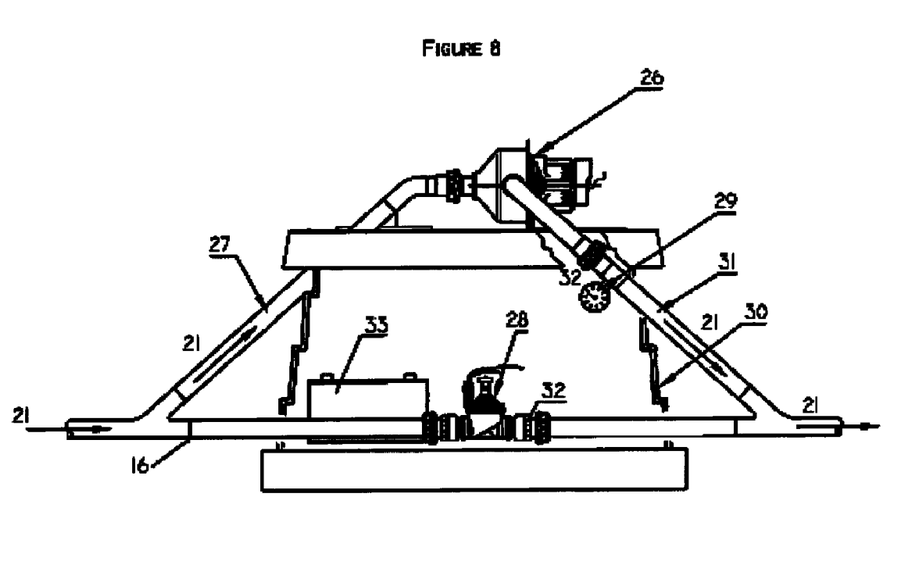
Figure 9:
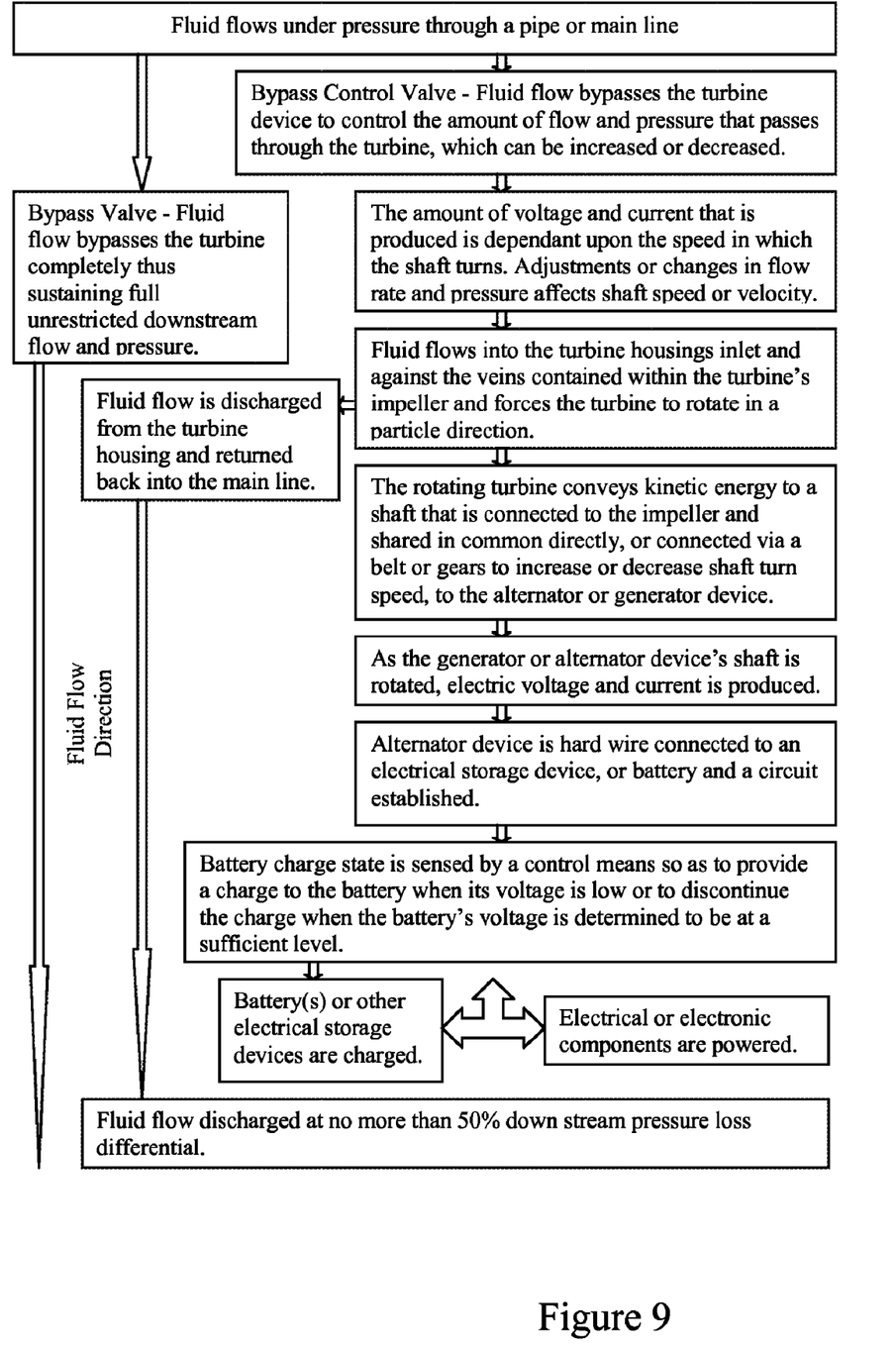
FIG. 9 is a flow chart showing the method of deriving the maximum amount of energy while focusing on the minimization of pressure loss.

FIG. 1 shows the frontal and rear projections of the turbine unit housing 1. The back view shows the volute scroll like shape of the housing 8 and the back plate 11 which is attached to the back of housing 1b using attachments 17 appropriate for the pressures that are to be expected during use of the invention. The center of the backing plate 11 shows ingress 11i for a shaft 10 which is shared in common and connected to impeller 4 and power generating means 33 to produce electrical energy. The frontal view shows fluid flow ingress port 2, through which incoming flow under pressure 21 enters, port 2 having a diameter 2d, and discharge portal 3, which allows for the egress of fluid from housing 1. Ingress port 2 is centered about the vertical axis of housing 1. Fluid flow under pressure 21, exiting from discharge port 3, is noted to be mostly perpendicular from the fluid flow 21 at fluid ingress port 2. An embodiment to this invention, not shown, is the ability to route the flow of fluid exiting from discharge port 3 to be in a direction axially related to the incoming flow 21. Hydraulic pressure pushed or drives the fluid into via ingress pipe 27e and out of the system through egress line 31 as shown in FIG. 8. Fluid discharge volute 8, circumferentially surrounds housing 1 along the horizontal axis, increases in volumetric size obtaining maximum diameter 8m approximately 360 degrees from the beginning of volute 8 at approximately 90 degrees below ingress port 2, where volute 8 has it's minimum volumetric size at 8 s. Volumetric size of the interior portion of volute 8 increases as a ratio of the cumulative volumetric openings of the impeller are exposed to the interior of volute 8. The volumetric size of volute 8 will never be smaller than the cumulative volumetric size of all of the openings of the impeller so as to decrease pressure loss and turbulence. FIG. 4 shows that volute 8 has an interior surface 8i and an exterior surface 8e. Interior surface 8i forms an arc whose opening is aligned with the horizontal axis of housing 1. Housing structural brace 1f provides support to exterior surface 8e where the discharge portal 3 joins volute 8, providing thrust support during startup. Not shown is the ability to attach utility ports along housing 1 so that instruments, pressure gauges or sensors can be attached to housing 1. The turbine housing assembly 1 consists of a body and components that can be constructed of numerous materials including rubbers, poly materials, plastic materials, composites, iron, steel, alloys or any other material.

Figure 2:
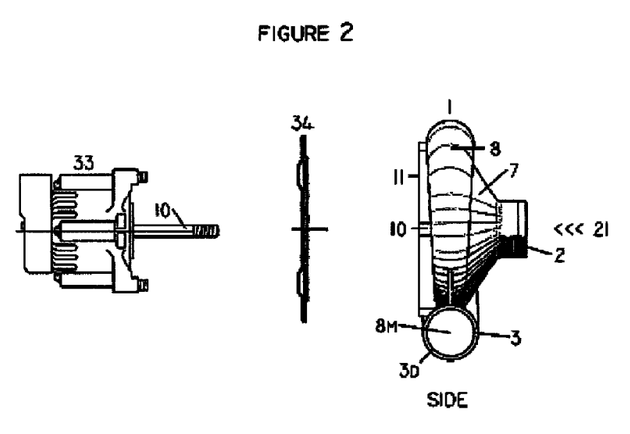
FIG. 2 details the side view of the exterior portion of the assembly showing the power generator, power generator mounting plate and the housing.

FIG. 2 shows the addition of a power generating means along with coupling plate 34. Plate 34 interfaces with backing plate 11 facilitating the bolt pattern of a power generating means. Plate 34 will have varying configurations to adapt to the different power generating means available to interface with this invention. FIG. 2 show an alternator type of power generating means whereby alternator 33 has shaft 10 and a bolt pattern that will interface with plate 34 and backing plate 11. In this embodiment, the power generating means is in axial alignment with the center of rotation of impeller 4 along vertical axis of housing 1. Not shown are other embodiments where the power generating means are attached to shaft 10 through means of gears, pulleys or other power transmission means, allowing for multiple power generating means to be associated with a single housing or where space limitations dictate a more compact style for a single power generating means.

Figure 3:
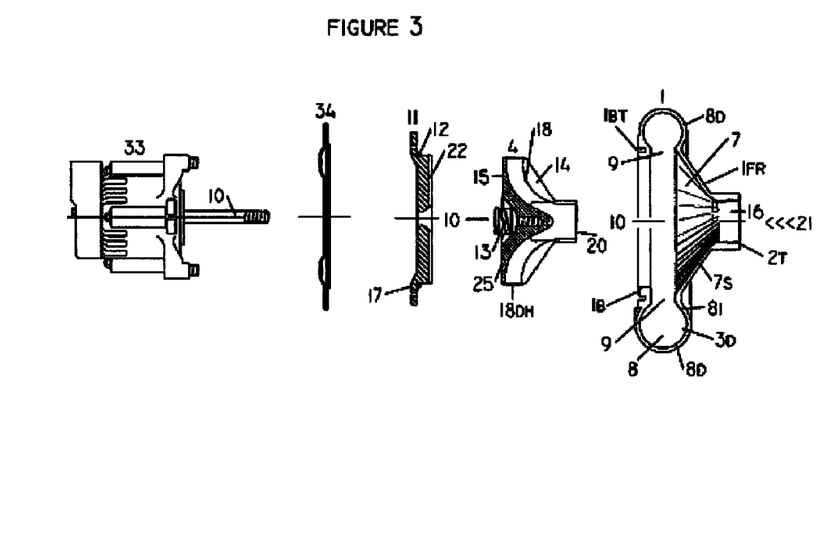
FIG. 3 shows the assembly from FIG. 2 providing further detail of the impeller and the housing backing plate.

FIG. 3 is an exploded view of the interface between the power generating means 33, coupling plate 34, backing plate assembly 11, impeller 4 and housing 1 in a cross-sectional view. The front of housing 1fr is the first object in the assembly. Fluid flow 21 enters ingress port 2, centered about the vertical axis of housing 1, and is adapted to receive fluid flow under pressure 21 from any range of piping systems through a coupling means 2t and comes in contact with spinner 20. In this invention, threads are the coupling means. The impeller chamber 7 is immediately adjacent to and is in fluid flow communication with, ingress port 2, and is shaped to conform to the exterior contour of impeller 4. It is critical that there is a minimal amount of clearance between the housing's interior slope 7s and the back plate 11 and impeller 4 so as not to interfere with the rotational functioning of impeller 4 under the force of fluid present. Furthermore, the impeller chamber (7) can be of a removable design (not shown) like a cover, for example, that can be bolted to the scrolled housing (8) to allow convenient access to the impeller or replacement of the chamber (7) to accommodate other impeller shapes and designs. FIG. 3 details the change in diameter 8d from the upper portion of the housing 1 to the lower discharge port 3. Discharge channel 9, which is circumferentially in communication with interior of volute 8i, facilitates the fluid communication between fluids expelled from a rotationally enhanced fluid flow divergence device or impeller 4 and is shaped to be slightly larger than the height of vanes 18 at the discharge location 18dh. Fluid exits impeller discharge end 5, then swirls out through the discharge channel 9 and into the directionally shaped internal volute 8i that is in fluid communication with circumferential outer edge of the impeller discharge end portion 5. Discharge channel 9 dimensional characteristics pertaining to the measurement of it's height and width, can be varied to a limited extent to accommodate different impeller sizes without having to replace the entire housing 1. The inner diameter of the volute 8i can become larger as the fluid makes its way through the scroll beginning at its smallest point 8s and proceeding out to its largest point 8m and then into the discharge or outlet end (3), in one embodiment of the system. In this embodiment, the volumetric interior space 8i of the scroll increases as the fluid moves through the structure toward the discharge end 3 of the housing 8. The inter diameter shape of the housing's volute structure (8D) and volumetric interior space (8i) can be of a round circular design (as shown in Drawing Page 1; FIG. 3, 8i) or an oval or out-of-round design or a combination of different curved shapes (not shown). This applies to both axial and tangential reference perspectives. Additionally, the discharge channel 9 can be located in a position outside the volumetric interior space 8i of the volute scroll or at any point within it. The impeller shaft and impeller need not be measurably centered within the circular center of the scrolled housing's shape design, but can be off-centered in any direction. The impeller 4 turns rotationally 24 in the opposite direction to the flow 21. As the fluid leaves said housing discharge outlet section 3, it rejoins down stream portion of said pressurized hydraulic pipe line 16, which is connected to the turbine housing 1, and is subsequently conveyed wherever the pipe line and its end openings distributes it, as shown in FIG. 8.

Housing back 1b is adapted to accept housing back plate 11 thereonto using appropriate connection means for the pressures anticipated. This invention uses bolts which are threadably attached to mountings 1bt. Plate 11 is further sealed from leakage by O-ring 12. The impeller back face 25 side is located adjacent to the housing back plate 11, which is the part that seals the impeller within the housing 1. The back plate 11 also serves as the mounting surface 17 for the electrical generator device not shown selected to function with the turbine system. The back plate seals against the housing an O-ring 12. A vane height spacer 22 can be utilized to center the impeller 4 within the impeller chamber 7 and is located between the back face 25 and the back plate 11. The vane height spacer 22 is used when narrower lower flow impellers 4 are incorporated wherein the spacer 22 occupies the void area within the chamber 7 to minimize the gap between the back face 25 and the back plate 11. The impeller shaft 10 passes through the center of the back plate 11, the vane spacer 22 and threads into the back face 25 side of the impeller face 15. A mechanical seal 13 can be utilized on the shaft 10 and between the impeller face 15 and the back plate 11 to seal the housing's internal pressure from external atmospheric pressure.

Unlike prior art designs, the sloped or curved natured of the face allows fluid flow 21 to contact the impeller 4 without loosing significant velocity. A hydrodynamic spinner 20 is placed at the leading point of the impeller and enables the expeditious transition of flow 21 from the by-pass ingress line 27 directly into the impeller 4. Ingress line 27 is coupled to turbine 26 through coupling means 32. Flow is received directly from the pipe line 16 and into the shrouded 14 impeller inlet 6 and, once having crossed the spinner 20, enters the sloping curve of the impeller face 19, which serves as the drive section of the impeller as hydraulic pressure is built-up and pushes against the logarithmic spiral designed vanes 18 that are radially and strategically located upon impeller front face 23. A shroud cover 14 can be optionally placed over the hydraulic drive side or front face side of the impeller.

Each prospective installation location will require the system operate with under various flow rates, static and dynamic pressures, pipe size inner diameters and power production requirements. The turbine is therefore designed to be able to adjust to these conditions by, generally, offering differing impeller 4 size diameters that include varying vane height 18hl, height, length and curves so as to maximize the efficiency of the system operating in a variety of conditions. One must create a power curve to optimize all variables in order to select the proper impeller for the conditions. Vane height and length variations contribute to the regulation of flow 16, flow restriction, shaft 10 rotational velocity or speed, rotational torque energy and subsequently power production. Taller vanes 18 permit more flow 16 volume and less flow restriction, but can reduce power production by decreasing shaft 10 speed, while shorter vanes are more restrictive and reduce flow, but increase power production by increasing shaft 10 rotation turn speed. Similarly, vane length 18hl and subsequent impeller diameter affects shaft 10 rotation speed and torque. Shorter vane lengths provide higher turn speed but with less kinetic energy or torque, while longer vanes provide lower turn speeds but with more torque or rotational power. Vane length selection will be important when selecting a particular electric generator 33 device to operate with this invention and will be most critical when functioning with a less efficient unit. An efficient generator 33 will produce more energy at a lower shaft 10 turn speed and will require less torque to achieve it, while an inefficient generator will require higher shaft 10 turn speed with greater torque. Determining the correct selection of an impeller to match the power curve for a particular site or location should involve consideration of flow restriction, shaft 10 rotation speed, shaft spin torque characteristics and power production requirements. This is a preliminary step in creating this system. This system involves the capabilities of using varying impellers to match the power requirements and fluid flow characteristics. Prior art does not need this preliminary step as the prior art turbines are not developed to maximize fluid flow discharge pressures but are designed to maximize power output at all costs.

Similar to the vanes, the shape and size of the spinner 20 will vary depending upon performance requirements of the system. Lengthening and narrowing its diameter will allow more flow 21 to pass into the impeller inlet 6, while shortening and making it thicker or larger in diameter will create increased head pressure. The latter will contribute to higher spin or shaft 10 turn speed and subsequently more electrical energy, but will increase pressure differential between the housing inlet 2 and outlet 3. The former conversely, will reduce the impeller shaft's 10 speed or turn velocity with decreased power production, but will also decrease the pressure differential between the inlet 2 and outlet 3 sections. In either case, the leading end of the spinner or the portion that makes first contact with flow 21 from the fluid flow source 16 will encompass a hydrodynamic curved or rounded bulbous point. Stator vanes not shown that further assist in directing flow and contribute to increasing shaft 10 turn speed, can be incorporated into the curved impeller face 19 or may also be incorporated just behind the spinner's 20 rounded leading end. It is then possible to use this method to regulate the pressure downstream of this system using one or more combinations of pressure affecting components. By changing the shape of spinner 20 to a larger more bulbous shape will increase the pressure differential by interfering with the fluid flow causing pressure loss. Similar affects will be obtained by changing the geometry of the actual vanes, allowing them to either interfere more greatly or with less interference with the fluid flow affecting the pressure differential as well. Simply allowing less flow into the system as a percentage of the total fluid flow from the supply will create a system will a lower pressure differential while still creating some power generating abilities. One other means of controlling the pressure differential is by introducing an electrical backfeed of current back through the motor. This creates an opposition to the current flow through the stator coils creating a magnetic reactance slowing the turning of the shaft. This backfeed can be variably adjusted by the presence of a series of pressure or flow sensors prior to and after this device in the piping system, communicating to a controller with pre-set set of instructions regulating the pressure differential. The method herein described in this patent can be used to control downstream pressure while generating power creating another embodiment to this method.

Referring now to FIG. 8, a by-pass pipe ingress line 27 emanating from main pipe 16 and by-pass egress line 31 which discharges back into main pipe 16 creates the by-pass piping structure which enables the turbine system 26 to utilize either all or only a portion of the pressure and flow 21 that is available in a larger pipe main line 16. Pressure and flow to the by-pass line would be adjusted or regulated by increasing or decreasing flow by restricting it between the upstream location where the by-pass branches off the main line to the ingress pipe 27 and the downstream side where the by-pass pipe reenters or reconnects to the main line on the egress pipe 31 side. Restricting the flow in the main pipe line 16 to increase or decrease flow to the by-pass piping structure is accomplished by the use of a by-pass flow control valve 28. A flow control valve 28 can be placed in the main line 16, being coupled by coupling means 32, between the locations where the by-pass pipe line first connects to the main line 27 and again where it reenters the main pipe 16 through discharge pipe 31. Turbine system 26 will provide current for application use or to be stored by battery 33 shown encased by housing 30.

Opening the by-pass flow control valve 28 would permit full flow 21 through the main pipe line 16 thus diverting it from the by-pass line 27 and the turbine system 26. Power would not be produced as all flow energy is directed away from the turbine 26. If more flow or pressure were required to drive, for example, irrigation valves and high flow sprinkler heads, the irrigation control system would be programmed to open the by-pass control valve 28 to increase dynamic flow or downstream flow 21 and pressure. This would reduce flow to the turbine system 26 and subsequently limit power production, but would permit the additional dispersion of water to the larger irrigation coverage zone that requires it. Conversely, closing or limiting flow 21 through the by-pass control valve 28 diverts fluid flow 21 from the main line 16 and redirects to the ingress pipe 27 and into the turbine system 26. Increased flow and pressure diverted into the by-pass line and turbine would increase power production by the pressure differential that would be created by the valve's closing action. Pressure differential would occur between the ingress pipe 27 and egress pipe 31 where it reenters the pressurized hydraulic pipe line 16 which can be measured through pressure gauge 29.

The turbine system design is specific to the impeller and turbine housing and can function with, or can be adapted to, most any electrical generator or alternator unit device produced by any manufacturer. The design, as herein explained, is intended to be flexible and adaptable, and able to adjust to the demands that are unique to the different types of applications and varying site conditions that may exist. Flexibility in housing and impeller design offerings, relative to size, vane height, length and thickness and adaptability of different power generator devices will enable the use of the system in a greater number of sites and locations. It will be appreciated by those skilled in the art that the invention described herein with reference to certain examples or preferred embodiments as shown in the drawings are by way of illustration and not limitation. Various additions, deletions, changes and alterations may be made to the above-described embodiments and examples without departing from the intended spirit and scope of this invention. Accordingly, it is intended that all such additions, deletions, changes and alterations be included within the scope of the following claims.

What is claimed is:

1. A Method for creating a Low Fluid Pressure Differential Electrical Generating System is provided that is in connection to and functions with a pipe system network that conveys fluid that flows under hydraulic pressure consisting of
    determining power curve efficiencies to be obtained,
    supplying a flow of fluid under pressure,
    diverting said fluid flow creating at least one divergence channel,
    controlling volume of said fluid flow into each said divergence channel,
    directing said fluid flow through said divergence channel into fluid entrance of a housing and into the an impeller chamber said chamber located internally of said housing,
    focusing said fluid flow onto a bulbous interface of a rotationally enhanced fluid flow device, said fluid flow device centrally located about said impeller chamber,
    conforming said fluid flow onto power generating vanes geometrically aligned about said flow device, said vanes conforming to said power curve efficiencies desired,
    exiting said vanes, creating a centrifugal force upon said vanes causing rotation, said flow device about a central axis, into an volumetrically varying voluted discharge channel, said channel having a discharge port,
    converting rotational energy of said fluid flow device into electrical power through use of a electrical generating means coupled to said rotating flow device,
    calibrating a pressure differential of said fluid flow through said network within a predefined range by using a pressure differential modulating means and
    returning of said fluid flow from said discharge port to said supply of fluid flow.

2. A Method for creating a Low Fluid Pressure Differential Electrical Generating System is provided that is in connection to and functions with a pipe system network that conveys fluid that flows under hydraulic pressure as in claim 1 where said fluid flow contacting the impeller's vanes is expeditiously conveyed radially from the center of the impeller face out the front side of each curved vane to the vane's discharge ends.

3. A Method for creating a Low Fluid Pressure Differential Electrical Generating System is provided that is in connection to and functions with a pipe system network that conveys fluid that flows under hydraulic pressure as described in claim 1 where said power generating means is capable of sustaining a majority of said hydraulic pressure between said fluid entrance and discharge port of the system or wherein said turbine system maintains an amount of less than fifty (50) percent dynamic pressure differential between said entrance and said discharge port, or fluid flow pressure measured at the said entrance is equal to or no more than twice as much as that which is measured at the discharge port when the system is operating in a non fluid flow bypass configuration.

4. A Method for creating a Low Fluid Pressure Differential Electrical Generating System is provided that is in connection to and functions with a pipe system network that conveys fluid that flows under hydraulic pressure as described in claim 1 where said electrical generating means is coupled to said rotating flow device enabling said electrical generating means to produce electric voltage and current, and wherein said electrical generating means includes any device selected from the group comprising electric generators, alternators, VDC motors of any size and type and all of which made or produced by any manufacture.

5. A Method for creating a Low Fluid Pressure Differential Electrical Generating System is provided that is in connection to and functions with a pipe system network that conveys fluid that flows under hydraulic pressure as described in claim 4 where said electrical generating means coupled to said rotating flow devices, said coupling includes at least one shaft wherein said shafts are connected together by incorporating mechanical leverage devices like reduction gears or pulley systems that increase shaft turn speed and velocity at the generator device so as to generate more electric voltage and current.

6. A Method for creating a Low Fluid Pressure Differential Electrical Generating System is provided that is in connection to and functions with a pipe system network that conveys fluid that flows under hydraulic pressure as described in claim 1 where said rotationally enhanced fluid flow divergence device provides a radial flow that enables said device to rotate on a center point perpendicular to axis of fluid flow, said device containing of multiple vanes, said vanes being radially spaced, emanating from a central axis in a logarithmic spiral, whereby each said vane has a maximum height at the point nearest said fluid flow axis and a minimum height at the open end at the point farthest from said fluid flow axis.

7. A Method for creating a Low Fluid Pressure Differential Electrical Generating System is provided that is in connection to and functions with a pipe system network that conveys fluid that flows under hydraulic pressure as described in claim 6 wherein said vanes incorporate sloping curved radiused plane extending linearly between said maximum of said vane of said minimum of said vane and said axis of rotation, said radiused plane designed to maximize centrifugal forces upon said vanes by said fluid flow, said radiused plane defining the volumetric discharge capacity of each said vane.

8. A Method for creating a Low Fluid Pressure Differential Electrical Generating System is provided that is in connection to and functions with a pipe system network that conveys fluid that flows under hydraulic pressure as described in claim 6 wherein each said vanes contains sharp cut leading and trailing edges where fluid flow makes first and last contact with said vane.

9. A Method for creating a Low Fluid Pressure Differential Electrical Generating System is provided that is in connection to and functions with a pipe system network that conveys fluid that flows under hydraulic pressure as described in claim 1 wherein said housing contains a voluted discharge tube portion that encircles said rotationally enhanced fluid flow device chamber portion to expeditiously convey fluid away from the said fluid flow device, said voluted discharge tube increasing in volumetric capacity in relation to the cumulative discharge of said fluid flow to a maximum capacity greater than the cumulative volumeric capacity of each said vane.

10. A Method for creating a Low Fluid Pressure Differential Electrical Generating System is provided that is in connection to and functions with a pipe system network that conveys fluid that flows under hydraulic pressure as described in claim 1 wherein said housing is adapted to accept sensory device through threaded ports measuring operating parameters, fluid flow states and fluid attributes.

11. A Method for creating a Low Fluid Pressure Differential Electrical Generating System is provided that is in connection to and functions with a pipe system network that conveys fluid that flows under hydraulic pressure as described in claim 1 wherein said entrance and said discharge port are the same diameter.

12. A Method for creating a Low Fluid Pressure Differential Electrical Generating System is provided that is in connection to and functions with a pipe system network that conveys fluid that flows under hydraulic pressure as described in claim 1 wherein said fluid entrance and said discharge port are not the same diameter.

13. A Method for creating a Low Fluid Pressure Differential Electrical Generating System is provided that is in connection to and functions with a pipe system network that conveys fluid that flows under hydraulic pressure as described in claim 1 wherein said electrical generating system can consist of multiple said housings, having multiple said fluid entrance and said discharge sections, each said housing containing said impeller chamber and said fluid flow device.

14. A Method for creating a Low Fluid Pressure Differential Electrical Generating System is provided that is in connection to and functions with a pipe system network that conveys fluid that flows under hydraulic pressure as described in claim 1 where said fluid entrance and said discharge port can be adapted to a pipe or hose that is associated with said pipe network, of any diameter using a connection or coupling means selected from a group consisting of bolted or threaded flanges, fittings, unions, threaded fittings, threaded adaptors or couplings, slip adaptors, compression couplings or fittings, welded joints, solvent weld or glue joints or pipe or hose sections or lengths that are integrated or unitized with said turbine system's inlet section.

15. A Method for creating a Low Fluid Pressure Differential Electrical Generating System is provided that is in connection to and functions with a pipe system network that conveys fluid that flows under hydraulic pressure as described in claim 1 where said divergence channel includes a bypass apparatus that permits any portion of, or an amount equal to all of said supplied fluid flow to bypass the electrical generating means so as to provide a plurality of flows and downstream pressures to the said pipe system network that conveys fluid flowing under hydraulic pressure and that said electrical generating means is in operation therewith.

16. A Method for creating a Low Fluid Pressure Differential Electrical Generating System is provided that is in connection to and functions with a pipe system network that conveys fluid that flows under hydraulic pressure as described in claim 15 where said turbine system can include said bypass apparatus that utilizes a restrictive control means selected from the group comprising hydraulic valves that are operated manually by hand or electronic control device or automatically by electric solenoids, servo-motors, actuators or relays, and/or ball or gate valves that are operated manually by hand or electronic control device or automatically by servo-motors, actuators, solenoids or relays of any kind or type.

17. A Method for creating a Low Fluid Pressure Differential Electrical Generating System is provided that is in connection to and functions with a pipe system network that conveys said supplied fluid that flows under hydraulic pressure as described in claim 15 where said bypass apparatus creates multiple divergence channels.

18. A Method for creating a Low Fluid Pressure Differential Electrical Generating System is provided that is in connection to and functions with a pipe system network that conveys fluid that flows under hydraulic pressure as in claim 1 where said power curve efficiencies optimize the amount of power to be generated versus the pressure drop tolerated based on coupling means torque, coupling means rotational speed, height of said vanes of said impeller and efficiency of the power generating means.

19. A Method for creating a Low Fluid Pressure Differential Electrical Generating System is provided that is in connection to and functions with a pipe system network that conveys fluid that flows under hydraulic pressure as described in claim 1 where said diverting of said fluid flow into at least one divergence channel and where said returning of said fluid flow to said supply, occurs at less than or equal to 45 degrees from the angle of said supply.

20. A Method for creating a Low Fluid Pressure Differential Electrical Generating System is provided that is in connection to and functions with a pipe system network that conveys fluid that flows under hydraulic pressure as described in claim 1 where said pressure differential modulating means is accomplished by changing the shape of said bulbous interface of said fluid flow device.

21. A Method for creating a Low Fluid Pressure Differential Electrical Generating System is provided that is in connection to and functions with a pipe system network that conveys fluid that flows under hydraulic pressure as described in claim 1 where said pressure differential modulating means is accomplished by changing the shape of said power generating vanes of said fluid flow device.

22. A Method for creating a Low Fluid Pressure Differential Electrical Generating System is provided that is in connection to and functions with a pipe system network that conveys fluid that flows under hydraulic pressure as described in claim 1 where said pressure differential modulating means is accomplished by regulating the percentage of said fluid flow diverted into said divergence channel by said bypass apparatus.

23. A Method for creating a Low Fluid Pressure Differential Electrical Generating System is provided that is in connection to and functions with a pipe system network that conveys fluid that flows under hydraulic pressure as described in claim 1 where said pressure differential modulating means is accomplished by inducing current flow back into the current producing members of the electric generating means, thereby requiring a rotor to overcome the resistive forces causing drag and increasing pressure differential.

* * * * *